July 17, 1956    R. B. SCHULZE ET AL    2,754,786
APPARATUS FOR CONTROLLED PRESSURE FORMING OF SHEET MATERIAL
Filed June 24, 1950    6 Sheets-Sheet 1

INVENTORS
RICHARD B. SCHULZE,
HENRY P. HESSLER,
CLARENCE M. DAVISON,
MAHLON A. WINTER,

BY  Martin E. Hogan Jr.
ATTORNEY

INVENTORS
RICHARD B. SCHULZE,
HENRY P. HESSLER,
CLARENCE M. DAVISON,
MAHLON A. WINTER,

BY Martin E. Hogan Jr
ATTORNEY

July 17, 1956 R. B. SCHULZE ET AL 2,754,786
APPARATUS FOR CONTROLLED PRESSURE FORMING OF SHEET MATERIAL
Filed June 24, 1950 6 Sheets-Sheet 4

INVENTORS
RICHARD B. SCHULZE,
HENRY P. HESSLER,
CLARENCE M. DAVISON,
MAHLON A. WINTER,
BY
ATTORNEY

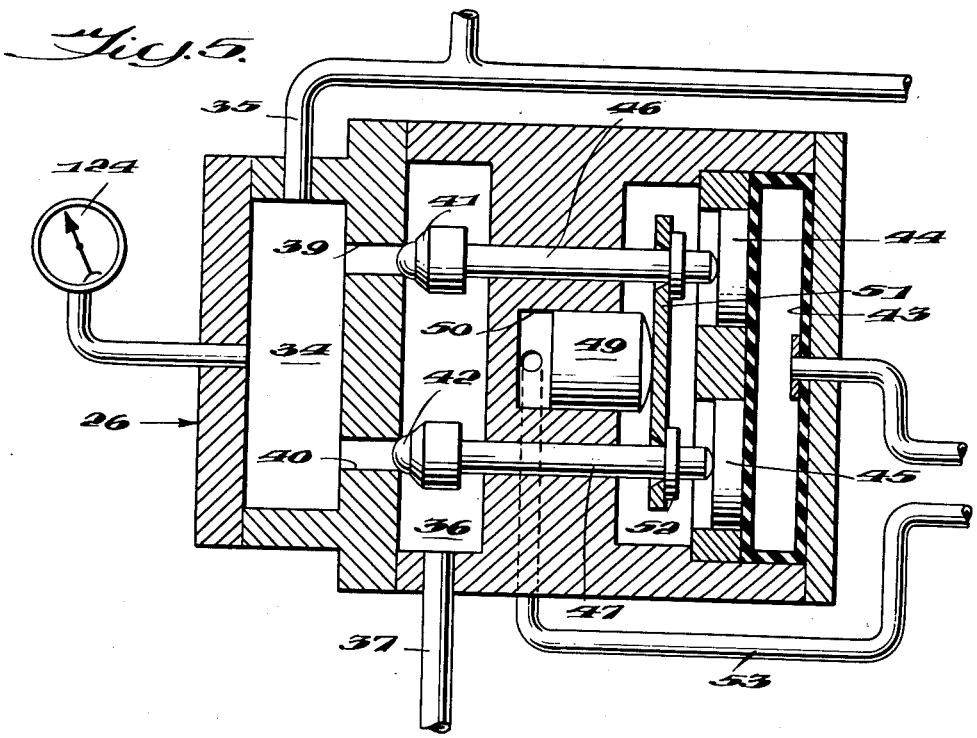
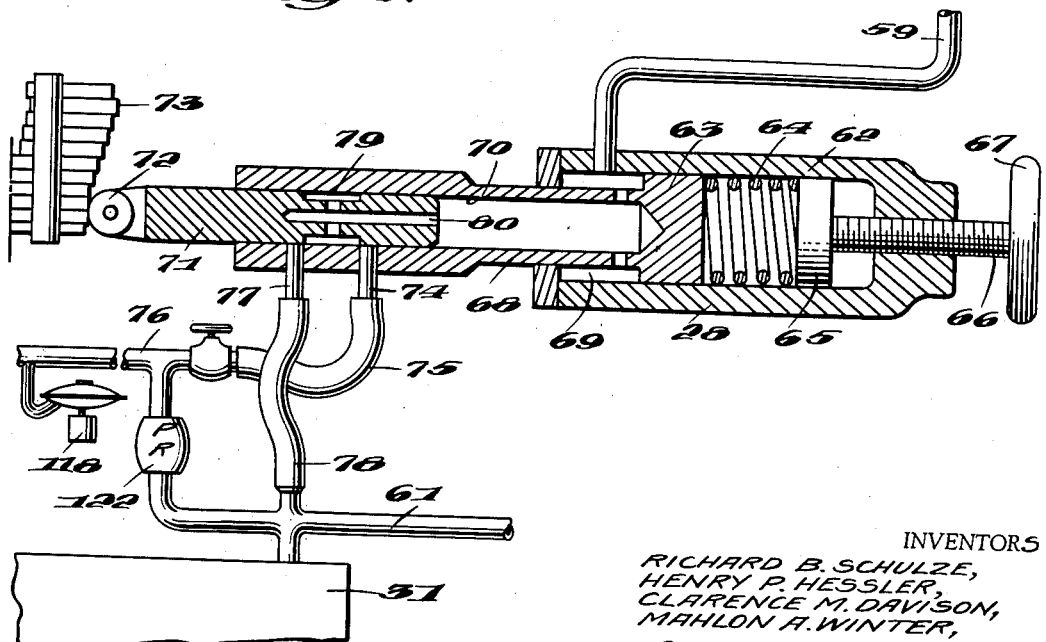
INVENTORS
RICHARD B. SCHULZE,
HENRY P. HESSLER,
CLARENCE M. DAVISON,
MAHLON A. WINTER,
BY
ATTORNEY

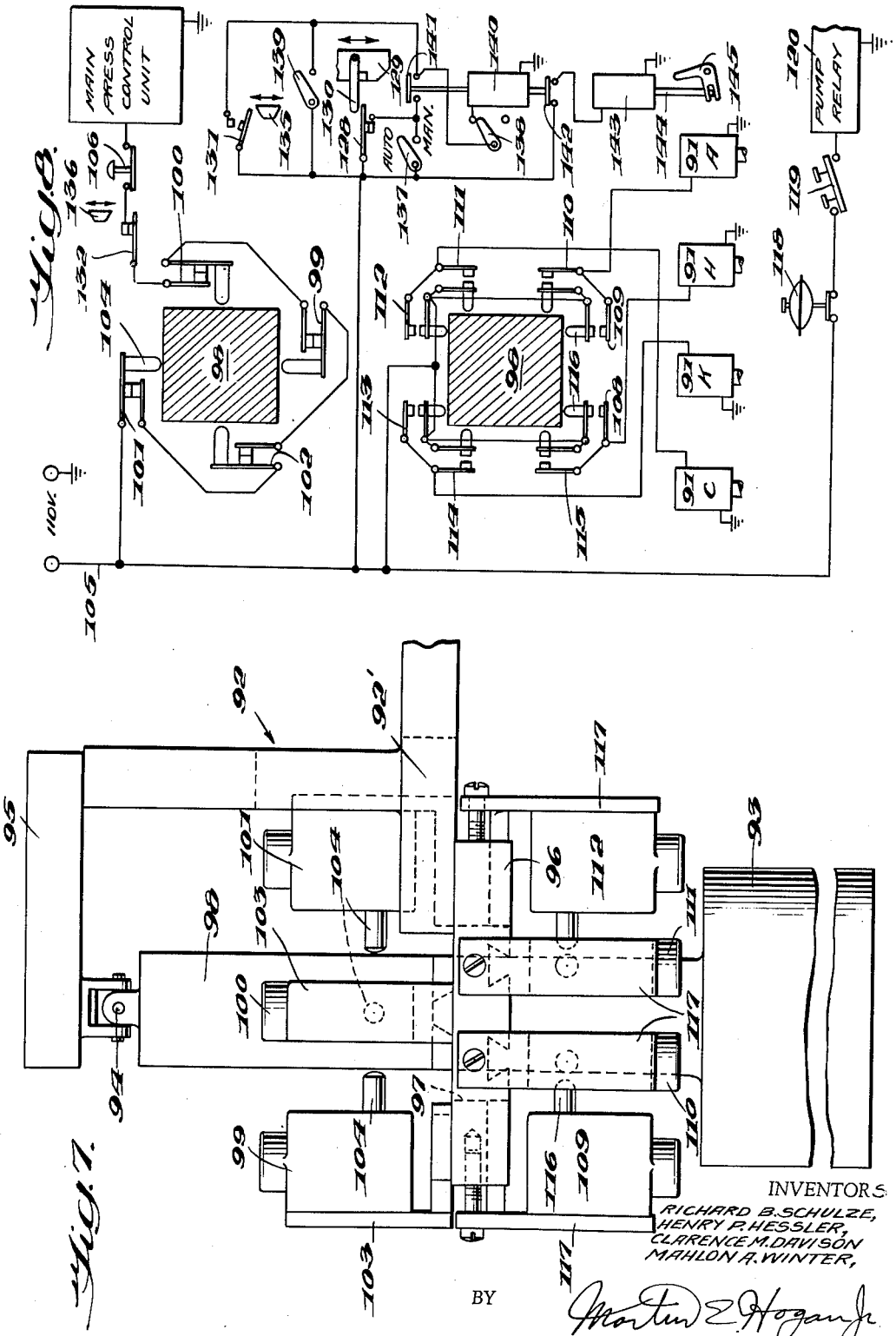

United States Patent Office 2,754,786
Patented July 17, 1956

2,754,786

APPARATUS FOR CONTROLLED PRESSURE FORMING OF SHEET MATERIAL

Richard B. Schulze, Henry P. Hessler, Clarence M. Davison, and Mahlon A. Winter, Baltimore, Md., assignors to The Glenn L. Martin Company, Middle River, Md., a corporation of Maryland Application June 24, 1950, Serial No. 170,106

6 Claims. (Cl. 113—44)

This invention relates to an improved apparatus for controlled pressure forming of sheet material of the type disclosed in our copending applications, Serial No. 30,766, filed June 3, 1948, now abandoned, and Serial No. 65,552, filed December 16, 1948, now Patent No. 2,605,731 issued August 5, 1952.

It is an object of this invention to provide a controlled pressure forming apparatus suitable for insertion between the platens of a conventional press, which apparatus will provide for relatively deep draws and yet will not require the use of a press having an excessive amount of "head room."

It is a further object to provide such an apparatus having a plurality of resistance units arranged about a central die block support carried by the bed of the main press and wherein a movable template surrounding said die block is adapted to be forced downwardly by the movement of the head during the forming operation, and to provide means for effectively transmitting the force applied to said template to said plurality of resistance units.

A further object is to provide in a forming apparatus as above described, control means for said resistance units normally connected to said units, in parallel, to simultaneously control the pressure therein, and means responsive to tilting of the template for temporarily relieving the pressure in certain of said units whereby to relevel the template.

It is a further object to provide in such a forming apparatus, stripper means for replenishing said resistance units following the forming cycle, said stripper means including control means therefor which are selectively operable to stop the stripping operation at any desired point.

It is a further object to provide for either automatic or manual control of the stripping operation in such an apparatus.

Further and other objects will become apparent from a consideration of the following specification and claims especially when taken in view of the accompanying drawings.

In the drawings:

Figures 5 and 6 are enlarged views of certain of the elements of the hydraulic control system.

Figure 7 is a side view of the tilt detecting mechanism; and

Figure 8 is a schematic diagram of the electrical control features incorporated in the apparatus.

Figure 3:
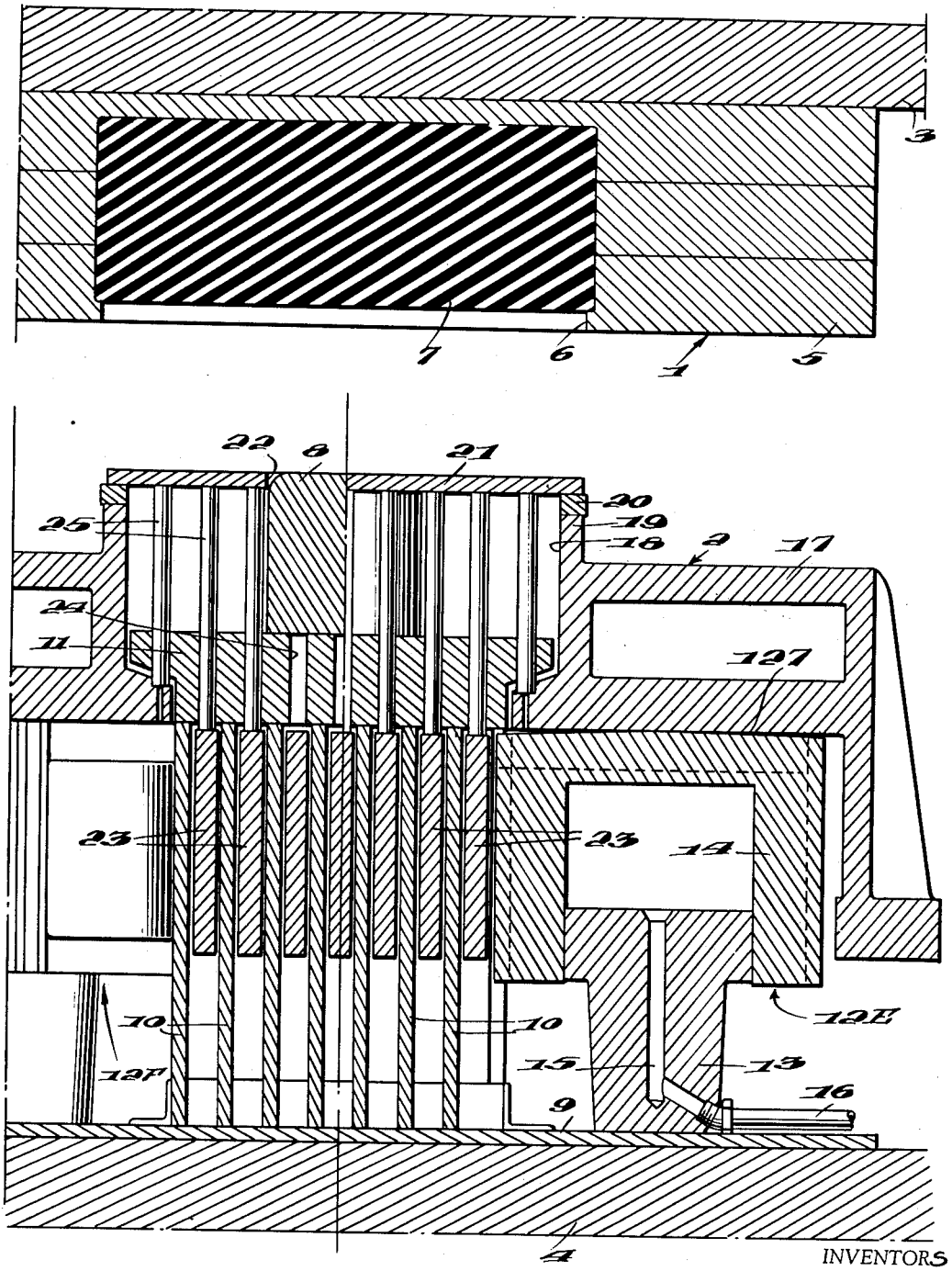
Figure 3 is a fragmentary transverse vertical section through the apparatus.

The improved forming machine includes a head 1 and a base 2 suitably carried by the movable and fixed platens 3 and 4 of a conventional hydraulic press. As best shown in Figure 3, the head comprises a box-like housing 5 provided with a generally central opening 6, in which is provided a pad or block 7 of rubber-like material. The manner of building up this pad or block is more fully described in our copending application Serial No. 30,766.

The base 2 consists primarily of means for supporting a die block 8 in fixed position opposite the pad in the head and means cooperating with the head and the die block for controlling the pressure of the rubber in the pad during the forming operation. The base includes a plate 9, suitably secured to the lower platen of the press, which plate in turn carries a plurality of spaced plates 10 standing on edge as shown in Figure 3 and which jointly serve to support a bolster 11. Die block 8 is in turn carried directly by the bolster 11.

Figure 2:
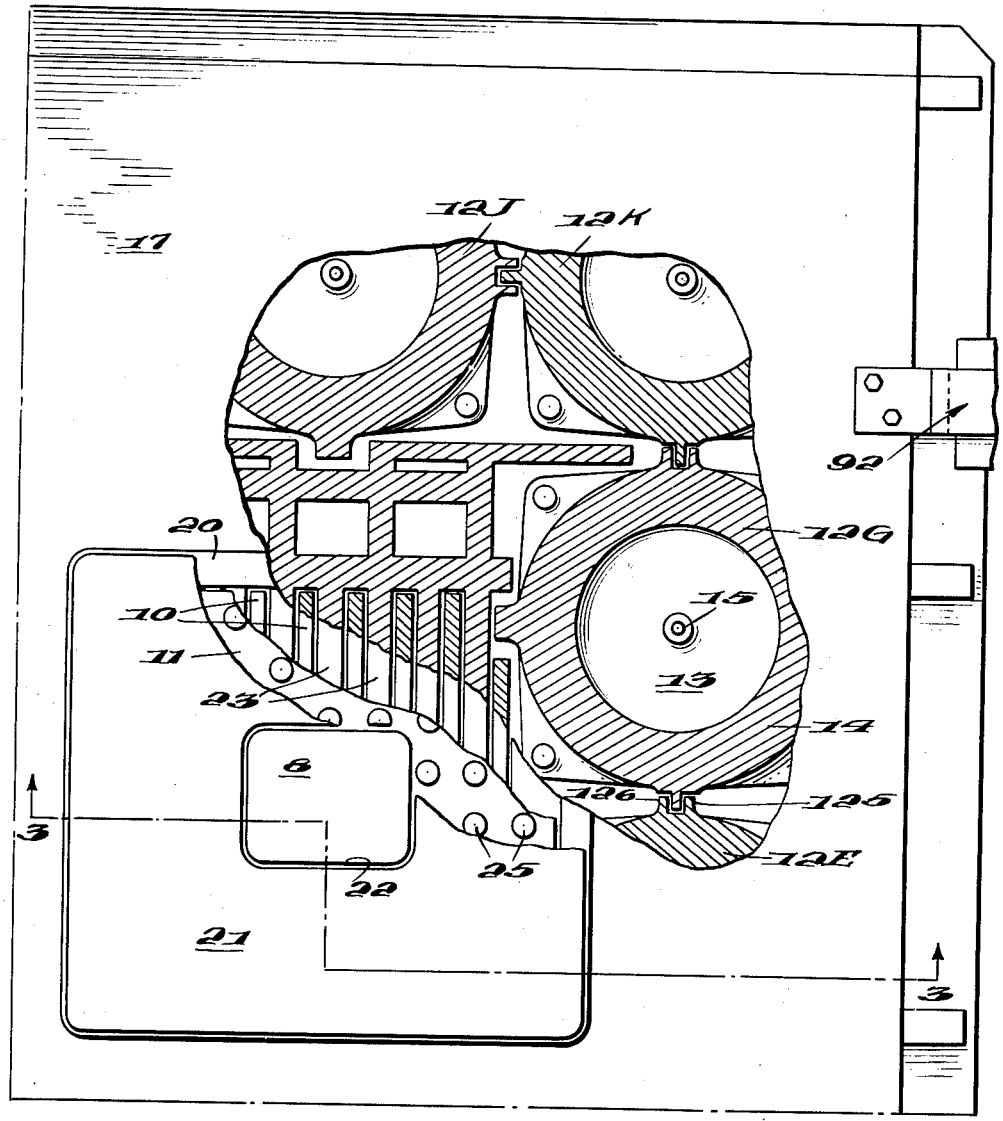
Figure 2 is a fragmentary plan view of the base portion of the apparatus with parts broken away to better show the internal construction thereof.
Figure 4:
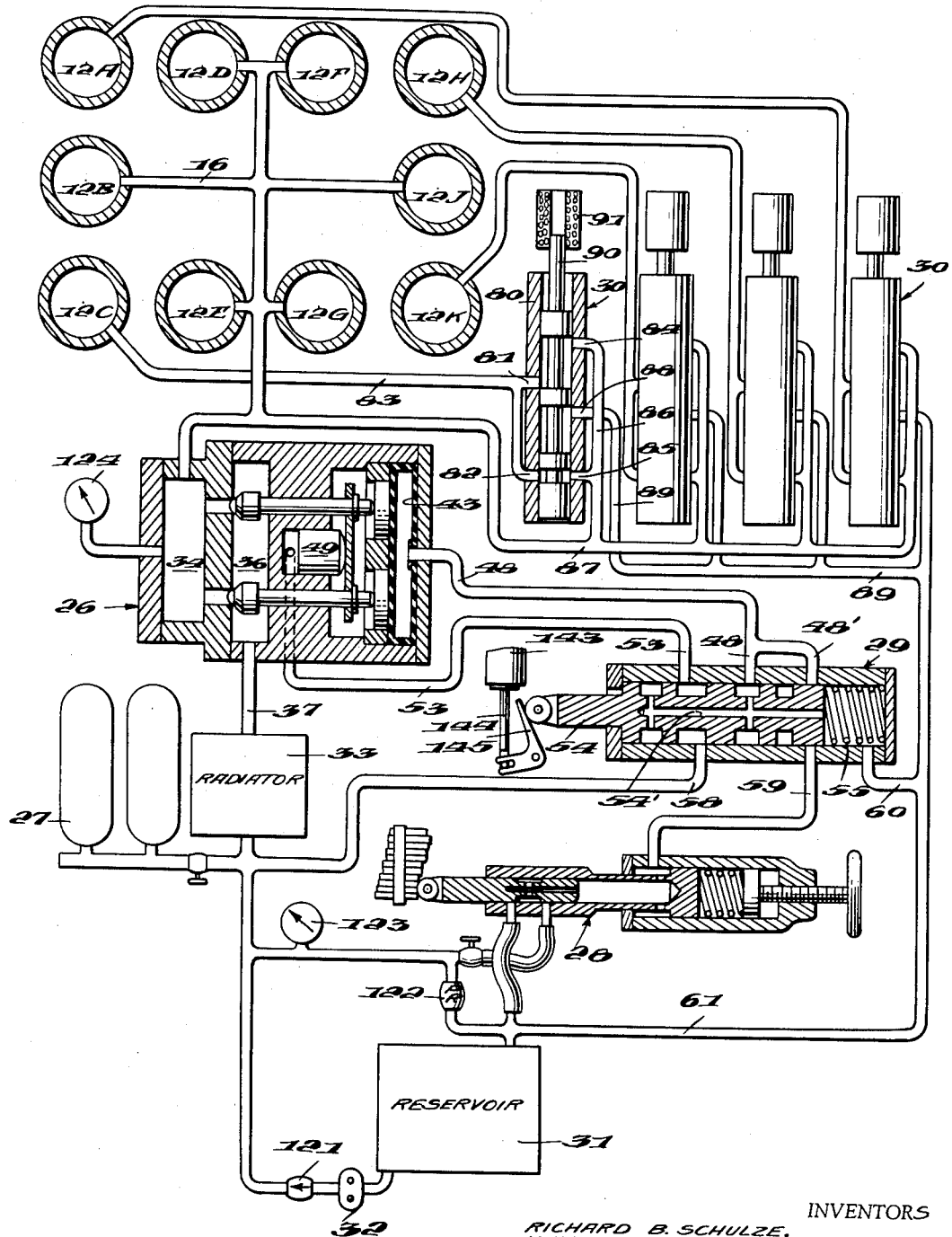
Figure 4 is a diagrammatic view of the pressure control system.

To apply pressure of predetermined value to the rubber pad in the head, the following mechanism is provided. Surrounding the group of plates 10 is a plurality of hydraulic cylinder and piston assemblies 12A–K, in this particular case, ten of such assemblies being provided, arranged as best shown in Figures 2 and 4. Each of these assemblies consists of a piston unit 13, suitably secured to the base plate 9 and slidably received within an inverted cylinder 14. The piston 13 is suitably bored as at 15 to provide a fluid connection from a supply line 16 to the cylinder. Suitable sealing rings (not shown) will of course be provided to insure a fluid tight fit between the cylinders and pistons.

Carried by the upper ends of the cylinder assemblies 12A–K is a box-section welded frame or superstructure assembly 17 provided with a generally central rectangular opening 18 adapted to loosely receive the bolster 11 as shown in Figure 3. The superstructure 17 includes upstanding walls 19 surrounding said opening and carrying at their upper surfaces a sealing ring 20, adapted to closely mate with the opening 6 in the head 1. Carried in turn by the sealing ring is a template 21 having its central portion cut out as at 22 to provide clearance for the die block 8.

Since the pressures involved in the forming machine of our invention are extremely high, it is necessary to provide means in addition to the sealing ring 20 for supporting template 21, since template 21 is subject over its entire upper surface to the pressure developed in the unit. As best shown in Figures 2 and 3, superstructure 17 includes a plurality of spaced parallel plates 23 arranged on edge and nested between the plates 10 carried by the base plate 9. With the parts arranged in the position shown in Figure 3, which corresponds to the condition at the start of a forming cycle, the upper edges of plates 23 will lie just below the under surface of bolster 11. Bolster 11 is provided with a plurality of holes 24, located in alignment with each of the plates 23 of the superstructure. A plurality of posts 25 is inserted in these holes so that each rests on the upper edge of the plate 23 therebelow, the posts being of such length that their upper ends are on the same level as the upper surfaces of the sealing ring 20 whereby they coact therewith to adequately support the template 21. Thus, assuming that the cylinders 12 are full of hydraulic fluid, it can be seen that when the head 1 is lowered toward the base, the rubber pad 7 will be completely confined between the template 21, die block 8 and housing 5. Pressure will therefore be built up in this rubber head and will be distributed through the template and the superstructure to the various cylinder assemblies 12A–K. The pressure of the rubber pad will be directly proportional to the pressure of the fluid in the cylinders, and, by controlling the pressure of such fluid in accordance with a predetermined pressure curve, the pressure of the forming rubber can be correspondingly controlled.

Turning to Figure 4, the complete hydraulic control system for the device is shown. The main elements of the hydraulic system in addition to the cylinders 12A–K, include a main variable-pressure-control valve 26 for controlling the flow of fluid to or from the cylinders 12; a low pressure storage system including an accumulator 27 for storing the fluid released from said cylinders under a predetermined low pressure; a cam controlled pilot valve 28 for controlling the pressure setting of the main valve during the forming operation; and a stripper control valve 29 for actuating the main valve to provide for the flow of low pressure fluid from the accumulator to the cylinders following the forming cycle, to strip the formed part from the die block and to return the parts to their Figure 1 position.

Since, as will be more fully set forth hereinafter, the cylinders 12A–K are normally connected hydraulically in parallel with one another, any eccentric loading due to such factors as an irregularly shaped die block, may tend to cause the superstructure assembly to tilt. Obviously such tilting tendency must be avoided to prevent binding and possible failure of the parts. To overcome this difficulty, applicants have provided a novel tilt preventing unit in conjunction with the main hydraulic control system. In addition to the above elements, there are therefore provided a plurality of solenoid actuated tilt compensating valves 30, interposed between certain of the cylinders and the main control valve for correcting any such tendency of the superstructure to tilt during the forming operation.

A low pressure supply system including a reservoir 31 and pump 32 is also provided for initially charging the low pressure system and the accumulators and to insure that this low pressure system is maintained full of hydraulic fluid at all times. If desired, a heat exchanger or radiator 33 may be provided between the main control valve and the accumulator to remove the heat produced in the fluid during the forming cycle.

Considering first the main control valve 26, best shown in Figure 5, it can be seen that this valve includes a high pressure chamber 34, connected by conduit 35 to the cylinders 12, and a low pressure chamber 36 spaced therefrom and in turn connected by conduits 37 and 38 to the accumulator or low pressure system. A plurality of ports 39 and 40 are provided between the chambers 34 and 36, the flow of fluid therethrough being controlled respectively by ball valves 41 and 42. Pressure of these valves against their seats is controlled by the pressure within a flexible control pressure chamber 43 which in turn applies pressure through the intermediacy of the elements 44 and 45 to the ends of the stems 46 and 47 of the ball valves. To minimize any tendency of the valve to chatter during operation, the cross-sectional area of port 40 is made slightly larger than port 39 so that valve 42 will open at a slightly lower pressure than valve 41. Sudden pressure surges which would tend to produce chattering are thereby avoided. As will be discussed in more detail herebelow, the pressure within the control chamber 43 will, during the forming stroke, be controlled by the pilot valve 28, while during the stripping cycle, chamber 43 will be connected to the exhaust line 61 running to the reservoir 31. To provide for the stripping operation, the main valve 26 is provided with a piston 49, centrally arranged therein within a cylinder 50, which piston is adapted to act against a plate 51 which in turn acts against suitable collars 52 formed on the stems 46 and 47 of the ball valves. Fluid is supplied to the cylinder 50 by means of conduit 53 as controlled by the stripper valve 29.

Stripper control valve 29 is a solenoid operated valve and comprises a plunger 54 normally urged to its Figure 4 position by spring 55 and adapted to be shifted axially upon energization of its actuating solenoid 143. The arrangement is such that with the solenoid deenergized and the plunger in its normal position as shown, stripper cylinder 50 is connected by conduit 53 and conduit 58 to the low pressure system whereupon fluid will flow from the accumulators into the cylinder 50 causing the piston 49 and plate 51 to move the ball valves 41 and 42 away from their seats and permit fluid to flow from the low pressure system through conduits 37 and 35 to fill the cylinders 12. Under these same conditions, it should be noted that chamber 43 is connected by conduit 48 to the exhaust port 60 and exhaust line 61 to the reservoir 31. Upon energization of solenoid 143, it will retract its plunger 144 to rock the operating lever 145 in a clockwise direction so as to shift the plunger 54 axially to the right. When the valve has been thus shifted to the right, stripper cylinder 50 will be connected by conduit 53 and central bore 54' of the plunger to exhaust port 60 while control chamber 43 will be connected by conduits 48, 48' and 59 to the pilot valve 28.

Figure 1:
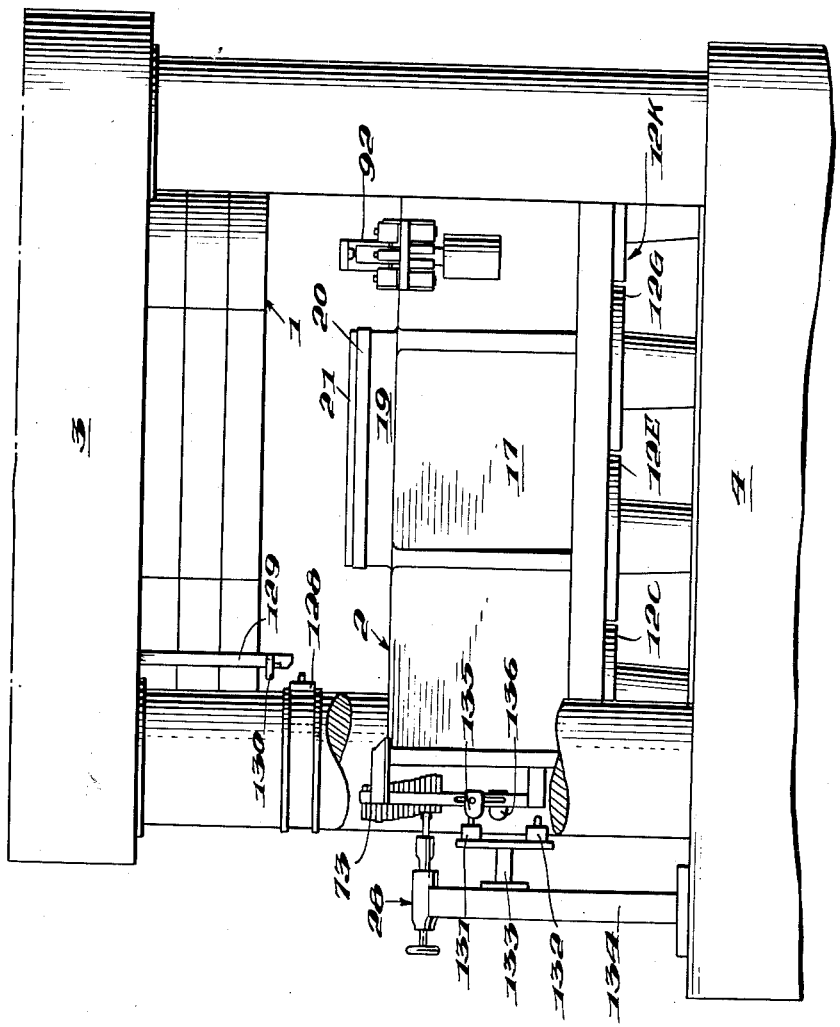
Figure 1 is a side view of the apparatus in operating condition within a main press, parts of the main press being broken away to better illustrate the device.

The pilot control valve 28 (see Figure 6) comprises a main cylinder housing 62 carrying therein a piston 63, urged by spring 64 toward the left hand end of the cylinder. Tension of the spring 64 may be readily varied by means of an adjusting piston 65 carried by the inner end of a threaded shaft 66 carrying a hand wheel 67. Piston 63 includes piston rod 68 which projects outwardly through the end wall of the cylinder 62, the space to the left of the piston 63 constituting a control chamber 69 in communication with the conduit 59. The piston rod 68 is bored as shown at 70 and slidably receives a control plunger 71 carrying at its outer end a roller 72 adapted to ride along the contour of an adjustable control cam 73 mounted to move with the superstructure 17 as best shown in Figure 1. The piston rod 68 is provided with a pressure port 74 which is connected to the low pressure system by flexible hose 75 and conduit 76. The piston rod also is provided with an exhaust port 77, connected by the flexible hose 78 with the exhaust line 61 and reservoir 31. The plunger 71 is provided with a peripheral groove 79 the axial extent of which is just slightly less than the spacing between the ports 74 and 77. This groove 79 is connected by a central bore 80 to the interior 70 of the piston rod and thence to the control chamber 69. It can be readily seen that if the cam moves the plunger 71 to the right, pressure fluid will be admitted from the port 74 to the chamber 69. As the pressure builds up within chamber 69, piston 63 will move to the right against the loading of spring 64, and, when the pressure within the chamber 69 just balances this loading, the piston rod 68 will have moved to the right sufficiently far to again shut off the port 74. Conversely, if the cam 73 at any particular time permits the plunger to move to the left, pressure within the chamber 69 (and within the chamber 43 of the main valve) will be relieved a corresponding amount. Under these conditions, as the fluid pressure drops slightly, the spring 64 will move the piston 63 and the rod 68 to the left to again close the port. The pressure control range of the pilot valve can obviously be regulated by varying the position of the piston 65 and the consequent loading on the spring 64.

As was indicated above, certain of the cylinders, instead of being connected directly to the main control valve, are connected through solenoid actuated tilt compensating valves 30 to said main valve. Each of these tilt compensating valves (see Figure 4) includes a housing 80 provided with a pair of cylinder ports 81 and 82 adapted to be connected as at 83 to its associated cylinder, and a pair of ports 84 and 85 connected together by conduit 86 which in turn is connected by conduits 87 and 35 to the pressure chamber 34 of the main valve. Intermediate the two ports 84 and 85 is an exhaust port 88 connected by conduit 89 to the exhaust line 61 and reservoir 31. The arrangement is such that when the valve plunger 90 is in its normal position as shown in the drawing, the cylinder is connected through conduit 83, ports 81 and 82, ports 84 and 85, and conduits 86 and 87 to the pressure chamber of the main valve. Under these conditions therefore, the effect is the same as if the tilt compensating valves were not even present. If, however, the solenoid 91 is energized, the plunger will be shifted so as to block ports 82, 84 and 85 and provide for flow of fluid from the cylinder through conduit 83, ports 81 and 88 and conduit 89 to exhaust. Thus it can be seen that when one of the tilt valves is actuated, it provides a somewhat restricted flow from its associated cylinder to exhaust, permitting the corresponding corner of the superstructure 17 to lower quickly to a position whereby it will again be level.

Control of the solenoids 91 for the tilt compensating valves is produced by a tilt detector 92 carried by the superstructure as best shown in Figures 1, 7 and 8. The tilt detector 92 comprises a bracket 92' carried by the superstructure and which serves to support a weighted pendulum 93 universally pivoted as at 94 from an overhanging arm portion 95, rigid with the bracket. The bracket 92' includes a generally square plate 96 provided with a central opening 97 through which the pendulum 98 projects. Mounted above this plate 96 are a plurality of normally closed sensitive electric switches 99, 100, 101 and 102, adjustably carried from the plate 96 by suitable brackets 103. As shown in Figures 7 and 8, these switches have their plungers 104 located closely adjacent the respective sides of the rod 98 so that swinging of the pendulum beyond certain limits will actuate one or the other of these switches 99–102 to open its contacts. As shown in Figure 8, switches 99–102 are arranged in series with the safety stop switch 106 in the usual safety circuit associated with the main press control unit 107 to stop the press in case of emergency. Thus switches 99–102 constitute safety switches which will interrupt downward movement of the main press in the event that the amount of tilting of the superstructure exceeds a predetermined safe value.

Returning to a consideration of the tilt detector, there is also provided a plurality of sensitive electrical switches 108–115 each having an actuating plunger 116, and being adjustably mounted by suitable brackets 117 as best shown in Figures 7 and 8. These switches are normally open circuit and are so adjusted relative to the pendulum rod 98 that a very slight movement of the rod toward a particular switch or switches will close the contacts thereof and energize one or the other of the tilt control solenoids 91. If, for example, the left hand side of superstructure 17 tends to lag in its downward movement, the pendulum bar 98 would swing to the right as shown in Figure 8 and close both switches 110 and 111. Switch 111 would complete a circuit from line 105 to solenoid 91C to actuate the tilt valve associated with cylinder 12C. Switch 110 would complete a circuit to solenoid 91A to actuate the tilt valve 30 associated with cylinder 12A. Thus, the total force resisting the downward movement of the left hand side of the superstructure would be considerably decreased with the result that the superstructure would rapidly level itself. It can be readily seen that diagonal tilting will be equally well compensated for.

The complete system also includes a pressure responsive switch 118, arranged in series with the pump control switch 119 (Figure 8) for controlling the pump relay 120. This latter relay by conventional means, not shown, controls the starting and stopping of the pump 32.

A suitable check valve 121 is provided to prevent reverse flow of fluid through the pump 32 while a pressure relief valve 122 is provided to limit the maximum pressure within the low pressure system. Pressure gauge 123 may be provided for indicating this latter pressure and a similar gauge 124 may be provided for indicating the pressure within the cylinders 12A–K at any particular time.

Adjustably carried on one of the guide columns of the main press, is a stripper Auto-Start switch 128. This switch has its contacts normally closed and is adapted to be momentarily actuated at a predetermined point in the upward movement of the head following the completion of the forming step. To thus actuate the switch a bar 129 is provided, pivotally carrying a one-way actuator 130 as clearly shown in Figures 1 and 8. Switch 128 and actuator 130 constitute selectively operable mechanism for initiating the stripping action when the head reaches a predetermined elevation in its upward movement.

A height control switch 131 and a depth control switch 132 are carried by a suitable bracket 133 from the post 134 used to support the pilot valve 28. Switch 131 is adapted to be actuated by an adjustable actuator 135 suitably carried by the superstructure 17, when the latter has reached a desired elevation. Switch 131 and actuator 135 therefore constitute adjustable means for stopping the stripping action in response to movement of the template to any selected elevation lower than the maximum elevation. Switch 132 is adapted to be actuated by a second adjustable actuator 136 when the superstructure has been forced down during the forming operation to a predetermined point.

In the normal operation of the device, the stripper action is entirely automatic. However, under certain conditions, for example, when "setting up" a new job on the device, it is desirable to be able to manually control the stripping operation so that the condition of the part being formed may be observed at any desired point in the forming cycle. There is, therefore, provided a switch 137 which, when in its Figure 8 position will provide for automatic stripping operation, and when in its other position will cut out the automatic stripping action. Under these conditions, stripping is manually initiated by momentarily opening stripper start switch 138. The stripping action can be stopped at any time by momentarily closing the stripper stop switch 139. The detailed operation of the control system will best be understood from the following description of the operation of the entire machine.

Assuming that switches 137, 138 and 139 are as shown in Figure 8, the machine will be set for automatic stripping operation. With the parts in the Figures 1 and 3 position, the device is in condition to start a forming cycle. Stripper control valve solenoid 143 will, as hereinafter described, be energized so that the pressure in the chamber 43 of the main valve will be under the control of the pilot valve 28 as previously described. Cylinders 12A–K will be full of hydraulic fluid. As the main press is actuated by the conventional control means, not shown, the head 1 will lower until the rubber pad 7 therein engages the metal blank which has been previously placed on the upper surface of template 21. Under these conditions, sealing ring 20 will engage the walls of the opening 6 in the head so as to completely confine the rubber pad. As the pad continues to move downward, it will apply pressure to the blank and to the superstructure which pressure will cause a corresponding pressure to build up in the hydraulic fluid trapped in the cylinders 12A–K. When this fluid pressure reaches a value corresponding to the setting of the pilot control valve, it will cause the ball valves 41 and 42 to open and allow the fluid to flow into the accumulator 27. As was described before, the pressure within the chamber 43 of the main valve is at all times during the forming cycle under the control of the pilot valve 28 and will therefore vary in direct proportion to any variations in the shape of the cam 73. As a result, the pressure of the fluid in cylinders 12A–K will likewise vary in direct accordance with the shape of the cam and the resulting pressure within the pad 7 will therefore be proportional to the cam shape. When the desired depth of forming has been obtained, switch 132 will be actuated by cam 136 to stop further downward movement of the head. The main press will then be controlled, by conventional means (not shown), to cause the head to again move upwardly. At a predetermined point during this upward movement actuator 130 will momentarily open switch 123 breaking the holding circuit of stripper control relay 140 and deenergizing this relay. Relay 140 will thereupon open its contacts 142 to deenergize the stripper control valve solenoid 143, permitting the plunger 144 thereof to move to the Figure 4 position. As previously described, such movement of the stripper control valve will disconnect the chamber 43 of the main valve from the pilot valve and permit it to exhaust to the reservoir. At the same time, pressure fluid from the low pressure system will be admitted to stripper cylinder 50 moving piston 49 against plate 51, which in turn will engage the collars 52 on the valve stems 46 and 47 and open the valves 41 and 42. Fluid from the low pressure system will thereupon flow from the conduit 47 through the main valve and into cylinders 12A-K. As this fluid flows into the cylinders, the head will begin to move upwardly and will continue such movement until cam 135 engages and closes the height control switch 131. Closure of switch 131 will again energize relay 140 which in turn will close its self-holding contacts 141 to maintain itself energized, and also its control contacts 142 which will energize the solenoid 143, stopping the stripping operation and again placing the main valve under the control of the pilot valve. The parts will now be in the same condition as at the start of the cycle and are in readiness for the beginning of a new forming cycle.

If, during the forming operation, the superstructure should begin to tilt for any reason, the weighted pendulum 98 will actuate one or more of the tilt detector switches 108 to 115 inclusive to energize the appropriate tilt valve solenoids 91. As was previously described, energization of one of these solenoids will shift the corresponding tilt valve so as to temporarily remove the corresponding corner cylinder from control by the main valve and connect it instead directly to the reservoir 31. This will relieve the force resisting downward movement of that particular corner of the machine and will therefore permit it to lower quickly until the superstructure is again level. If, however, the degree of tilting is unusually severe, one or more of the overtilt switches 99 to 102 will be opened to stop operation of the main press. As best shown in Figure 3, the upper surface of each of the cylinders 14 is shaped as indicated at 127 so that it contacts the underside of the superstructure 17 over but a relatively small area adjacent the axis of the cylinder. Thus, if the superstructure tilts, the load will still be transmitted to the cylinder generally axially thereof, thus minimizing the eccentric loading which would otherwise obtain. Note also that the cylinders 14 are provided with a tongue and groove sliding connection therebetween as shown at 125 and 126 to permit relative movement of the cylinders incidental to such tilting action.

The forming machine as described herein is especially well adapted for use where the amount of "head room" between the upper and lower platens of the press is relatively limited. By providing the spaced plates 10 for supporting the bolster and die block and the plates 23 integral with the superstructure and nested therebetween, it is possible to adequately support the die block and the template 21 so that they will withstand the relatively great pressures to which they are subjected. At the same time, these plates 21 transmit the load to the main portion of the superstructure which in turn distributes it over the plurality of fluid pressure cylinders 12.

By providing the adjustable height and depth switches 131 and 132, it is possible, where a relatively shallow depth of draw is desired, to provide a form block of correspondingly small height. Then the actuator 135 for switch 131 may be adjusted so that it will cause shifting of the stripper control valve to stop the stripping action at the instant that the template 21 has been raised by the superstructure to the level of the top of such die block. This feature greatly enhances the versatility of the machine.

While but one form of the invention has been illustrated and described in detail, it is believed obvious that many variations and alterations could be made without departing from the spirit and scope of the invention as defined by the appended claims.

We claim as our invention:

1. In a forming machine of the type having a base, a die block carried thereby, and a forming head movable toward the base for forming a metal blank about said die block and including a pad of yieldable rubber-like material serving as the forming medium, a movable template surrounding the die block and arranged opposite said pad for supporting the blank during the forming operation and means for resisting downward movement of said template to vary the pressure in the pad, said resisting means comprising a plurality of laterally spaced fluid pressure units movably supporting said template from said base, a variable pressure control valve, means normally connecting said units, in parallel, to said pressure control valve whereby said valve will simultaneously control the fluid pressure in all of said units, and means responsive to tilting of said template toward one side for blocking the connection between the valve and certain of said units supporting the opposite side thereof and for relieving the fluid pressure in said certain units whereby to relevel the template.

2. In a forming machine of the type having a base, a die block, means disposed generally centrally of said base for supporting said die block, and a forming head movable toward the base for forming a metal blank about said die block and including a pad of yieldable rubber-like material serving as the forming medium, a plurality of fluid pressure resistance units on said base surrounding said die block supporting means, a template surrounding said die block and arranged opposite said pad for supporting said blank during the forming operation, and a superstructure carried by said units and movably supporting said template, said template being adapted to be forced downwardly by said pad during the forming operation against the resistance of said units acting through said superstructure, a variable pressure control valve, means normally connecting said units, in parallel, to said pressure control valve whereby said valve will simultaneously control the fluid pressure in all of said units, and means including tilt detecting means carried by the superstructure and responsive to tilting of said template toward one side to block the connection between the valve and certain of said units supporting the opposite side of said superstructure and to relieve the fluid pressure in said certain units whereby to relevel the template.

3. In a forming machine of the type having a base, a die block, means disposed generally centrally of said base for supporting said die block, and a forming head movable toward the base for forming a metal blank about said die block and including a pad of yieldable rubber-like material serving as the forming medium, a plurality of fluid pressure resistance units on said base surrounding said die block supporting means, a template surrounding said die block and arranged opposite said pad for supporting said blank during the forming operation, and a superstructure carried by said units and movably supporting said template, said template being adapted to be forced downwardly by said pad during the forming operation against the resistance of said units acting through said superstructure, a variable pressure control valve, means normally connecting said units, in parallel, to said pressure control valve whereby said valve will simultaneously control the fluid pressure in all of said units, means including tilt detecting means carried by the superstructure and responsive to tilting of said template toward one side to block the connection between the valve and certain of said units supporting the opposite side of said superstructure and to relieve the fluid pressure in said certain units whereby to relevel the template, and means controlled by said tilt detecting means and responsive to tilting of said template in excess of a predetermined amount for stopping the downward movement of said head.

4. In a forming machine of the type having a base, a die block carried thereby, and a forming head movable toward the base for forming a metal blank about said die block, a plurality of fluid pressure resistance units carried about the periphery of said base and defining an open space generally centrally of the base, means located within said space for supporting said die block above said base, a template surrounding said die block, and a superstructure for supporting said template from said units and including a portion extending downwardly in intermeshed relationship with said die block supporting means below the top of said units and into the space therebetween, for transmitting the direct vertical thrust applied to said template by said head to the remainder of said superstructure and thence to said resistance units.

5. In a forming machine of the type having a base, a die block carried thereby, and a forming head movable toward the base for forming a metal blank about said die block, a plurality of fluid pressure resistance units carried about the periphery of said base and defining an open space generally centrally of the base, means located within said space for supporting said die block above said base, a template surrounding said die block, and a superstructure for supporting said template from said units, said die block supporting means comprising a plurality of generally vertically extending plates carried by said base in spaced parallel relationship, and said superstructure including a second set of generally vertically extending plates nested between said first mentioned plates and extending below the level of the upper ends of said resistance units and into the space therebetween and adapted to transmit the vertical thrust applied to said template by said head to the remainder of said superstructure and thence to said resistance units.

6. In a forming machine of the type having a base, a die block, means disposed generally centrally of said base for supporting said die block, a forming head movable toward the base for forming a metal blank about said die block and including a pad of yieldable rubber-like material serving as the forming medium, a plurality of fluid pressure resistance units on said base surrounding said die block supporting means, a template surrounding said die block and arranged opposite said pad for supporting said blank during the forming operation, and a superstructure carried by said units and movably supporting said template, said template being adapted to be forced downwardly by said pad during the forming operation against the resistance of said units acting through said superstructure, a variable pressure control valve, means normally connecting said units, in parallel, to said pressure control valve whereby said valve will simultaneously control the fluid pressure in all of said units, and means including tilt detecting means carried by the superstructure and responsive to tilting of said template toward one side to block the connection between the valve and certain of said units supporting the opposite side of said superstructure and to relieve the fluid pressure in said certain units whereby to relevel the template, each of said units having its upper end formed to provide a relatively small, generally central area in engagement with said superstructure, whereby to minimize eccentric loadings on said units due to any tilting of said template and superstructure.

References Cited in the file of this patent

UNITED STATES PATENTS

| | | |
|---|---|---|
| 1,626,051 | Rode | Apr. 26, 1927 |
| 1,745,549 | Marghitan | Feb. 4, 1930 |
| 1,866,595 | Glasner | July 12, 1932 |
| 2,055,077 | Guerin | Sept. 22, 1936 |
| 2,269,778 | Merrill | Jan. 13, 1942 |
| 2,317,869 | Walton | Apr. 27, 1943 |
| 2,327,177 | Cross | Aug. 17, 1943 |
| 2,331,430 | Shoemaker | Oct. 12, 1943 |
| 2,350,795 | Monier | June 6, 1944 |